(12) United States Patent
Sakata (10) Patent No.: US 7,876,015 B2
(45) Date of Patent: Jan. 25, 2011

(54) STATOR AND ELECTRIC MOTOR (75) Inventor: Takatoshi Sakata, Yamatotakada (JP)

(73) Assignee: JTEKT Corporation, Osaka-shi, Osaka (JP)

( * ) Notice: Subject to any disclaimer, the term of this patent is extended or adjusted under 35 U.S.C. 154(b) by 206 days.

(21) Appl. No.: 12/230,319

(22) Filed: Aug. 27, 2008

(65) Prior Publication Data
US 2009/0058216 A1 Mar. 5, 2009

(30) Foreign Application Priority Data
Aug. 28, 2007 (JP) ............................. 2007-221509

(51) Int. Cl.
*H02K 3/34* (2006.01)
(52) U.S. Cl. ........................................ 310/194; 310/71
(58) Field of Classification Search .................. 310/71, 310/194
See application file for complete search history.

(56) References Cited

U.S. PATENT DOCUMENTS

| | | | | |
|---|---|---|---|---|
| 5,900,687 A * | 5/1999 | Kondo et al. | .................. | 310/71 |
| 6,856,055 B2 * | 2/2005 | Michaels et al. | .............. | 310/71 |
| 7,342,334 B2 * | 3/2008 | Hilton et al. | .................. | 310/71 |
| 7,569,964 B2 * | 8/2009 | Ijima | .......................... | 310/194 |
| 7,598,637 B2 * | 10/2009 | Niehaus et al. | ............... | 310/71 |
| 2007/0200450 A1 * | 8/2007 | Yukitake | ..................... | 310/216 |
| 2008/0106161 A1 * | 5/2008 | Matsuzaki et al. | ............ | 310/71 |

FOREIGN PATENT DOCUMENTS

| | | |
|---|---|---|
| JP | 11-098786 | 9/1999 |
| JP | 2001-119871 | 4/2001 |
| JP | 2002-325385 | 11/2002 |
| JP | 2005-287240 | 10/2005 |
| JP | 2006-014548 | 1/2006 |
| JP | 2007-236057 | 9/2007 |

* cited by examiner

*Primary Examiner*—Burton Mullins
(74) *Attorney, Agent, or Firm*—McGinn IP Law Group, PLLC (57) ABSTRACT

Plate-shaped projections are provided on a front insulator in such a manner as to project towards a front housing. In addition, projecting pieces are provided on a surface of each projection which confronts an inner circumferential surface of a stator housing. The projecting pieces are provided on each projection in such a manner as to form three rows which are parallel to an inner circumferential direction of the stator housing. Spaces between the respective rows constitute guide paths by which the transition wirings which connect between the coils are disposed on the projection in such a manner as to be spaced apart from each other.

7 Claims, 6 Drawing Sheets

STATOR AND ELECTRIC MOTOR

BACKGROUND OF THE INVENTION

The present invention relates to a stator and an electric motor and more particularly to a stator and an electric motor having a structure for preventing a contact between transition wirings of stator cores.

Many inner-rotor type electric motors in which a rotor having permanent magnets rotates inside a stator on which electromagnets are disposed radially are used. In those inner rotor type electric motors, each electromagnet includes a stator core which is made from a magnetic material and a coil made up of an electric wire wound round the stator core through an insulator and is provided with its magnetic line of force oriented to the rotor or inwards of the stator. In the electric motors constructed in the way described above, since the rotor resides inside the stator, transition wirings for wiring each coil to each other need to be passed round a periphery of an outer circumference of the stator. Because of this, JP-A-2002-325385 discloses a structure in which transition wirings retaining projections are provided on an outer circumferential portion of a stator, so that transition wirings are passed round outer circumferential sides of the projections so as to wire confronting or mating coils of the same phase to each other.

In the case of a star-connected three-phase alternating current motor being used, however, coils of three systems need to be wired, and this requires transition wirings of three systems to be laid out to pass round the periphery of an outer circumference of a stator, and all of the transition wirings of three systems at the most are retained on the same projection. In this case, respective transition wirings are brought into contact with each other on the same projection or in the vicinity thereof. In particular, when a transition wiring which goes from the projection to the coil portion intersects a transition wiring which goes to the adjacent projection, it becomes easy for both the transition wirings to be brought into contact with each other. Here, since such transition wirings are normally insulated wirings (for example, enameled wires), although the contact of transition wirings with each other does not cause a problem on the spot, there may be a possibility that the transition wirings are made to rub against each other due to vibration or the like to thereby break the insulations of portions of the transition wirings which are in contact with each other, whereby a conductive state is produced between the portions in question of the transition wirings.

SUMMARY OF THE INVENTION

The invention has been made in view of these situations and an object thereof is to provide stator having a structure which prevents the contact of transition wirings which connect confronting or mating coils to each other, and an electric motor having the stator.

In order to achieve the object, the present invention provides the following arrangements.

(1) A stator for an electric motor, comprising:

a plurality of stator cores each made from a magnet material;

an insulator which covers the stator cores; and a plurality of insulated electric wires which are wound round the stator cores through the insulator so that a plurality of coils are formed round the stator cores and a plurality of transition wirings are formed for wiring the plurality of coils to each other, wherein the insulator includes a plurality of projections for retaining the plurality of transition wirings, wherein each of the projections is formed with a plurality of guide paths for individually disposing the plurality of transition wirings at intervals and in substantially parallel.

(2) The stator according to (1), wherein the plurality of guide paths are formed by providing a plurality of projecting pieces on a surface of the projection.

(3) The stator according to (2), wherein lengths of the guide paths in a width direction of the projection are made to gradually increase towards the stator core.

(4) The stator according to (1), wherein the guide paths are formed by recessed grooves provided on the projection.

(5) The stator according to (1), wherein a width of the projection increases towards the stator core.

(6) An electric motor comprising:

a substantially cylindrical rotor including a permanent magnet; and the stator according to (1) which surrounds an outer circumference of the rotor.

According to the configuration described above, since the insulator includes the projections on which the transition wirings are retained, the transition wirings are retained on the projections, and hence, there is impending no risk that the transition wirings are brought into contact with an inner circumferential surface of the housing or the rotor. In addition, since the plurality of guide paths are formed on the projections for disposing thereon individually the plurality of transition wirings which are made up of the plurality of insulated electric wires at intervals in such a manner that the wirings are spaced apart from each other, the contact of the transition wirings with each other on the projections can also be prevented.

According to the configuration above, since the guide paths are formed by providing the plurality of projecting pieces on the surface of the projections, the guide paths can be formed inexpensively and easily. The projecting pieces can easily be formed using a projecting piece forming mold, and after projecting pieces have been molded by the mold, no special processing step such as, for example, a groove cutting step needs to be added.

The lengths of the guide paths in the width direction of the projection increase towards to stator core, that is, the lengths of the guide paths become longer as the guide paths are closer to the stator. Consequently, even though the path for the transition wiring going from the coil to the projection and the path for the transition wiring going from the projection to the adjacent projection intersect or approach come closer to each other, there is impending no risk that the transition wirings are brought into contact with each other. Namely, the risk of contact between the transition wirings can be prevented further. Here, the lengths of the guide paths mean the lengths of portions where the transition wirings are retained on the projections and where the transition wirings are held substantially in a straight line at all the times.

According to the invention, the stator can be provided which can prevent the contact of the transition wirings.

BRIEF DESCRIPTION OF THE DRAWINGS

FIGS. 2A to 2C are diagrams showing the insulator of the electric motor according to the embodiment of the invention. FIG. 2A is a front view, FIG. 2B is a side view, and FIG. 2C is a rear view of the insulator.

FIGS. 5A to 5F are exemplary diagrams showing the wiring method applied to the insulator of the electric motor according to the embodiment of the invention.

DETAILED DESCRIPTION OF PREFERRED EMBODIMENTS

Hereinafter, the structure of an electric motor according to an embodiment of the invention will be described with reference to the accompanying drawings.

Figure 1A:
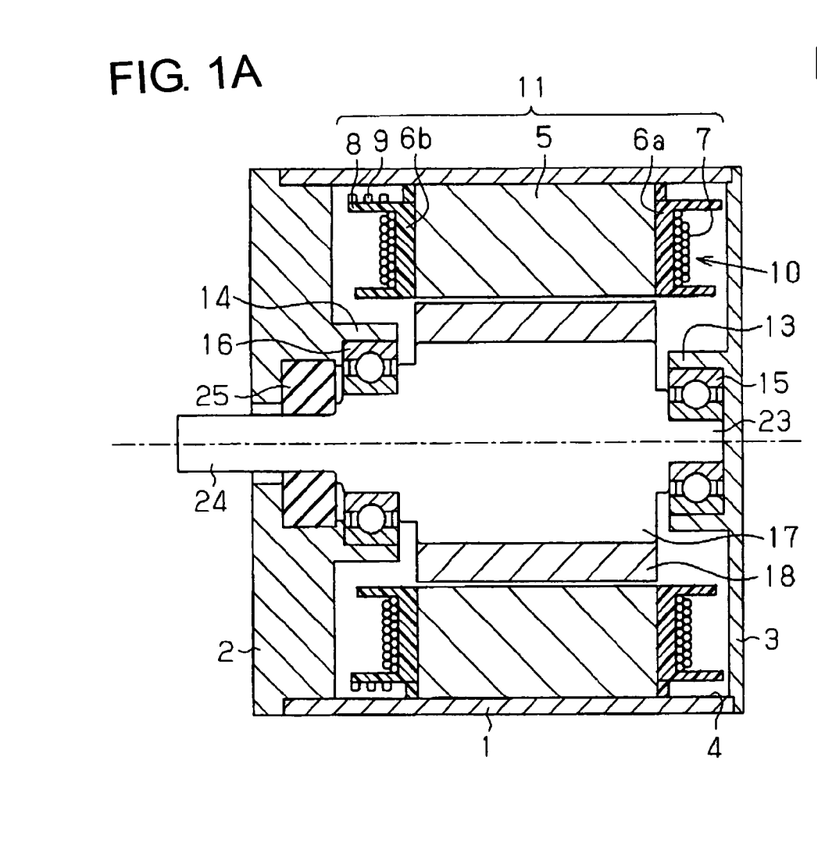
FIG. 1A is an axial sectional view showing the structure of an electric motor according to an embodiment of the invention.
Figure 1B:
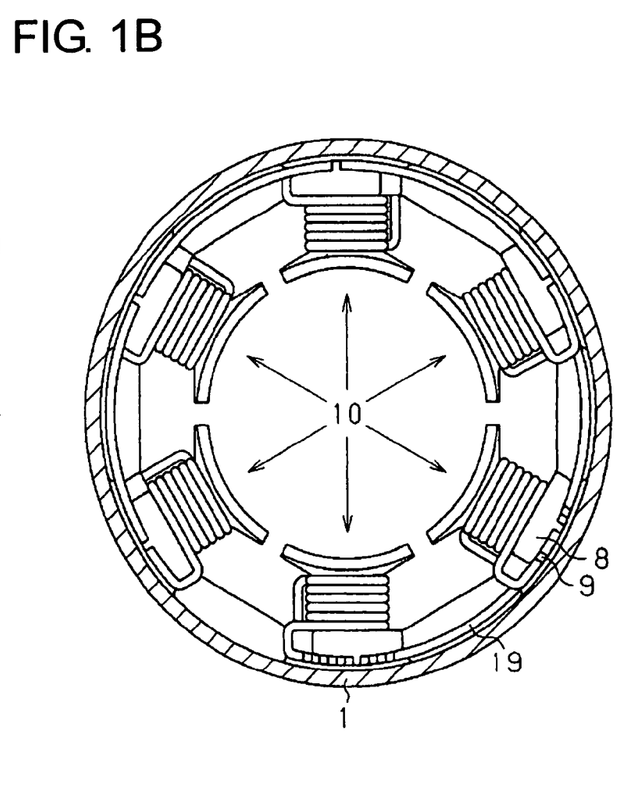
FIG. 1B is a cross sectional view taken along the axis of the electric motor which shows the structure an insulator.

Referring to FIG. 1A and FIG. 1B, a housing of an electric motor according to an embodiment of the invention has a configuration in which both ends of a substantially cylindrical stator housing 1 are sealed by a substantially annular front housing 2 and a substantially circular disc-shaped rear housing 3, respectively. Six stator cores 5 are disposed radially in such a manner as to be close to an inner circumferential surface 4 of the stator housing 1. Note that the stator core 5 is made from a magnetic material. A front insulator 6b is fitted on front housing 2 side end portions of the stator cores 5. In addition, a rear insulator 6a is fitted on rear housing 3 side end portions of the stator cores 5. The front insulator 6b and the rear insulator 6a are substantially annular members which are molded from a resin having insulation properties. Windings made up of insulated electric wires 7 are wound round the stator cores 5 through the front insulator 6b and the rear insulator 6a, whereby coils 10 are formed. An electromagnet is formed by the coil 10 and the stator core 5. Note that all magnetic forces of the electromagnets are directed towards a center axis of the front housing 2. In this way, a stator 11 is formed by the front insulator 6b, the rear insulator 6a, the stator cores 5, projections 8 and the insulated electric wires 7. In addition, the stator cores 5 are brought into contact with the inner circumferential surface 4 of the stator housing 1, and the stator 11 is fixed to the stator housing 1.

A substantially cylindrical projecting portion 13 is provided at a central portion of an inner surface of the rear housing 3, and a rolling bearing 15 is fixed to an inner circumferential surface of the projecting portion 13 through a loose fit or tight fit. One of end portions or a rear end 23 of a rotating shaft 17 is rotatably supported by the rolling bearing 15. A rotor 18, which is a permanent magnet, is fixed to an outer circumferential surface of a longitudinally central portion of the rotating shaft 17 in such a manner as to confront the stator 11.

A substantially cylindrical projecting portion 14 is provided at a central portion of an inner surface of the front housing 2, and a rolling bearing 16 is fixed to an inner circumferential surface of the projecting portion 14 through a loose fit or tight fit. One of end portions or a front end 24 of the rotating shaft 17 is rotatably supported by the rolling bearing 16.

Furthermore, the front housing 2 has a through hole in the central portion thereof, and the front end 24 of the rotating shaft 17 projects outwards of the motor housing through this through hole, so that a gear, a rotor or the like, which is not shown, can be fixed to the front end 24 depending upon an application of the electric motor. In addition, a sealing structure 25 is provided between the rotating shaft 17 and the front housing 2.

Figure 2A:
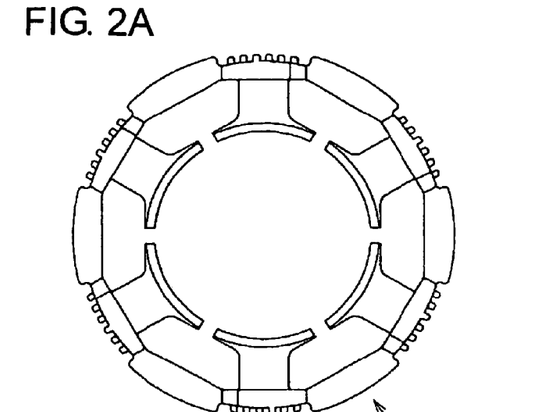
Figures 2B, 2C:
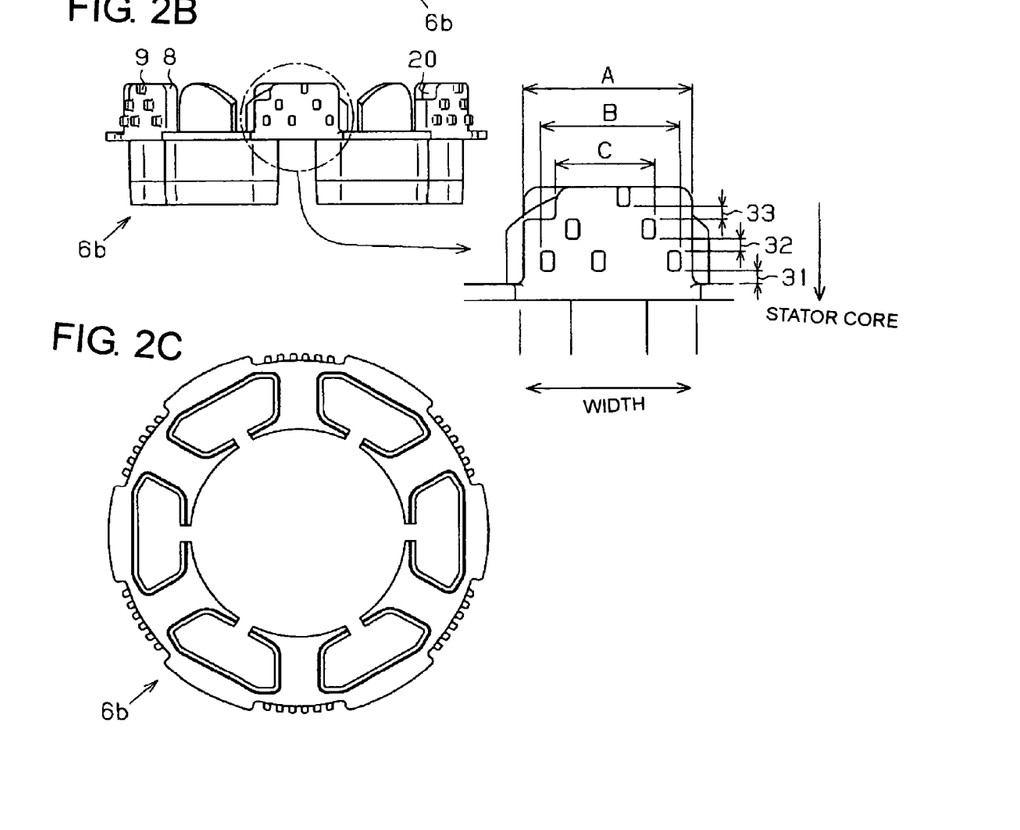
Figure 3:
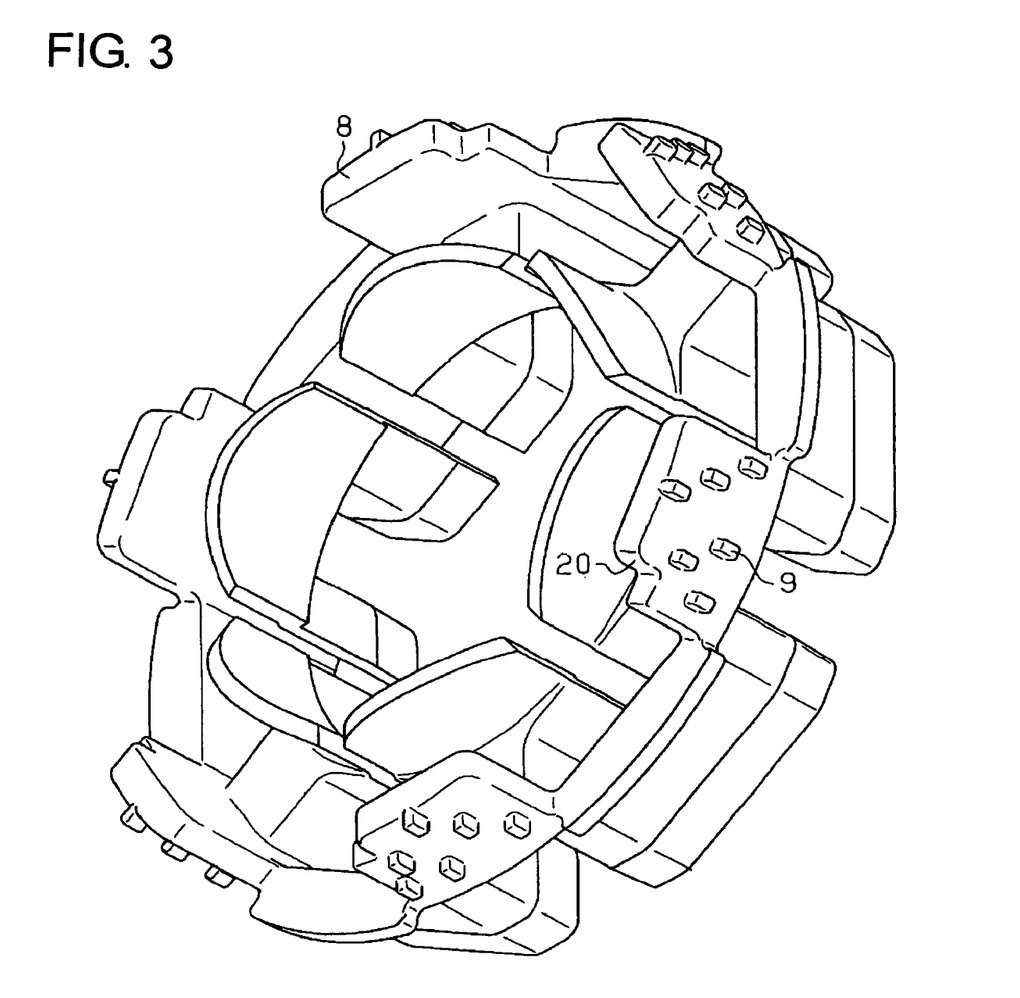
FIG. 3 is an isometric projection view of the insulator of the electric motor according to the embodiment of the invention.

Next, the front insulator 6b will be described by reference to FIGS. 2A to 3 as well as FIGS. 1A and 1B.

Plate-shaped projections 8 are provided on the front insulator 6b in such a manner as to project towards the front housing 2 with one of surfaces thereof oriented towards the inner circumferential surface 4 of the stator housing 1. In addition, referring particularly to FIG. 2B, although the projection 8 is formed into a substantially rectangular plate shape, the projection 8 has a cut-out 20 in a top left-hand side corner portion as viewed in FIG. 2B.

Projecting pieces 9 are provided on a surface of each projection 8 which confronts the inner circumferential surface 4 of the stator housing 1. The projecting pieces 9 are installed on each projection 8 in such a manner as to form three parallel rows with an inner circumferential direction of the stator housing 1. Note that maximum distances between the projecting pieces which make up the same rows are made to increase gradually as they come closer to the stator core 5. In addition, as is shown in a straightforward fashion in FIGS. 2A, 2B, all the projecting pieces 9 are disposed spaced apart from each other in a direction which is parallel to the rows formed by the projecting pieces 9.

Furthermore, by partitioning the surface of each projection 8 which confronts the inner circumferential surface 4 of the stator housing 1 by the rows formed by the projecting pieces 9, guide paths 31 to 33 are formed parallel to each other for disposing thereon transition wirings 19 in such a manner as to be spaced apart from each other. In addition, as has been described above, the length of the guide path means the length of a portion where the transition wirings are retained on the projection or where the transition wirings are held in a more or less straight line on the projection at all times. Referring to an enlarged view in FIG. 2B, a length A of the guide path 31 is determined by a width of the projection 8 which is parallel to the guide path 31. This is because a transition wiring that is retained along the guide path 31 is retained in a more or less straight line along the full length of the length A not only in a path which connects the coil 10 with the projection 8 but also in a path which connect the projections 8 with each other. Next, for the same reason, a length B of the guide path 32 is determined by a maximum distance between the projecting pieces 9 which make up the same row which the guide path 32 contacts. Finally, for the same reason, a length C of the guide path 33 is determined by a distance between the position where the cut-out 20 is formed in the projection 8 to the projecting piece of the projecting pieces 9 which the guide path 33 contacts which lies farthest away from the cut-out 20. In addition, the width of the projection 8 is reduced in the portion where the cut-out 20 is formed compared with the remaining portion. In other words, since the cut-out 20 is provided, the width of the projection 8 is made to increase towards the stator core 5. In addition, the lengths A to C of the guide paths 31 to 33 are made to increase gradually towards the stator core 5, that is, the lengths of the guide paths are increased in the order of C, B and A.

Figure 4:
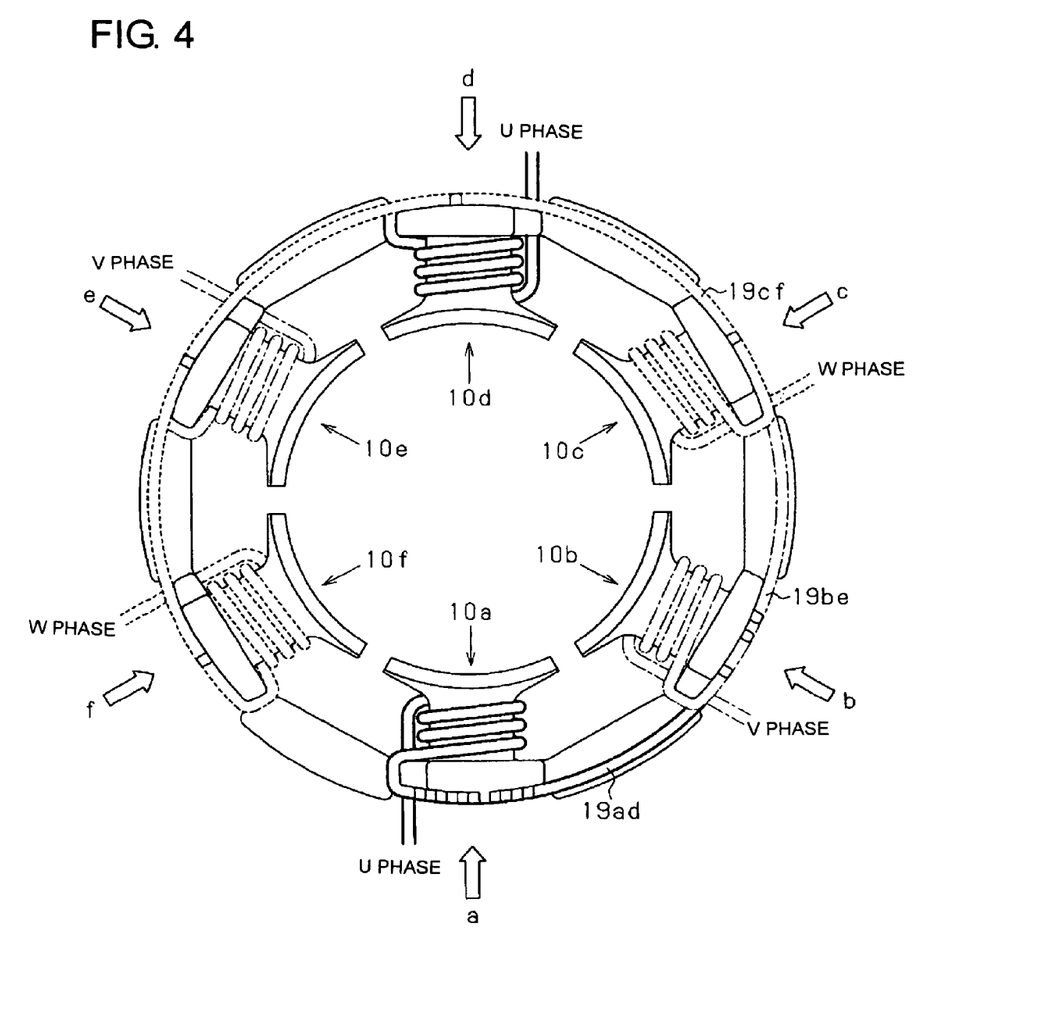
FIG. 4 is an exemplary diagram showing a wiring method applied to the insulator of the electric motor according to the embodiment of the invention.
Figure 5A:
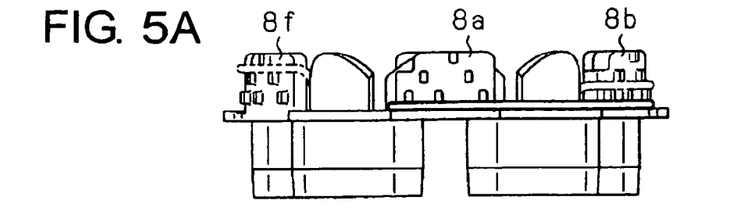
FIG. 5A is a side view as viewed from a direction a in FIG. 4.
Figure 5B:
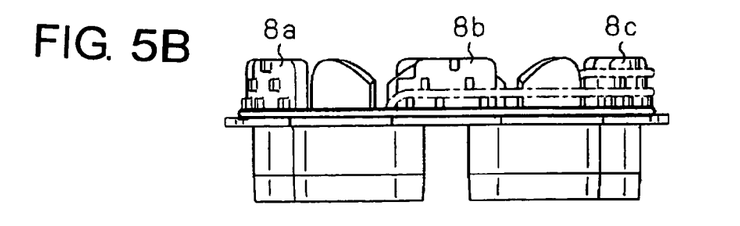
FIG. 5B is a side view as viewed from a direction b in FIG. 4.
Figure 5C:
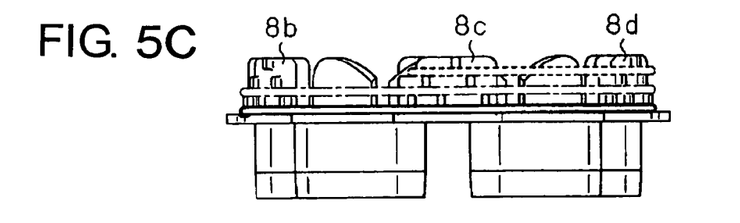
FIG. 5C is a side view as viewed from a direction c in FIG. 4.
Figure 5D:
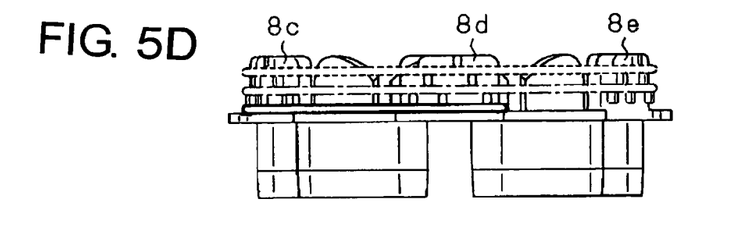
FIG. 5D is a side view as viewed from a direction d in FIG. 4.
Figure 5E:
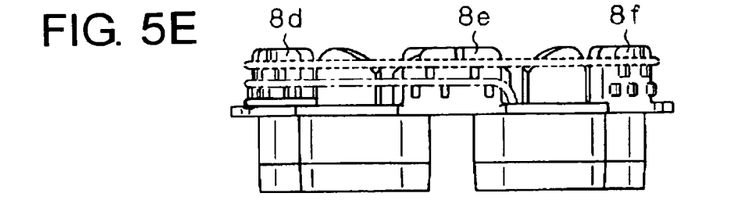
FIG. 5E is a side view as viewed from a direction e in FIG. 4.
Figure 5F:
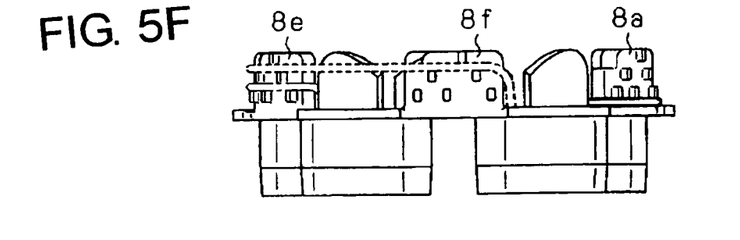
FIG. 5F is a side view as viewed from a direction f in FIG. 4.

Following the above, referring to FIGS. 4 to 5F, as well, a case will be described in which three-phase alternating currents are star-connected using the insulator according to the invention. An insulated electric wire 7 which makes up a U-phase wire (hereinafter, referred to as a U wire) is wound round to form windings on the stator cores 5 through the front insulator 6b and the rear insulator 6a, whereby a coil 10a and a coil 10d are formed and a U-phase transition wiring 19ad is formed which wires the coil 10a and the coil 10d to each other. Referring particularly to FIG. 5A, the U-phase wire 19ad forms the coil 10a, passes through the guide path 31 which lies closest to the stator core 5 as the U-phase transition wiring 19ad, and is retained on to a projection 8a. No other transition wiring 19 is retained on the projection 8a, and hence, there is no risk that the transition wirings 19 are brought into contact with each other in the vicinity of the projection 8a.

An insulated electric wire 7 which makes up a V-phase wire (hereinafter, referred to as a V wire) is wound round to form windings on the stator cores 5 through the front insulator 6b and the rear insulator 6a, whereby a coil 10b and a coil 10e are formed and a V-phase transition wiring 19be is formed which wires the coil 10b and the coil 10e to each other. Referring particularly to FIGS. 5A and 5B, the V-phase transition wiring 19be passes through first the guide path 31 and next the guide path 32 which is closer to the stator core 5 and is then retained on to a projection 8b. Although the V-phase transition wiring 19be comes closer to the U-phase transition wiring 19ad which is taking a path extending from the projection 8a to the projection 8b on a path extending from the coil 10b to the guide path 32 on the projection 8b, since the guide path 31 and the guide path 32 are disposed spaced apart from each other and the length A of the guide path 31 and the length B of the guide path 32 are different, there is caused no risk that the U-phase transition wiring and the V-phase transition wiring are brought into contact with each other. In addition, since the guide path 31 and the guide path 32 are disposed spaced apart from each other also on the projection 8b, there is caused no risk that the U-phase transition wiring and the V-phase transition wiring are brought into contact with each other.

An insulated electric wire 7 which makes up a W-phase wire (hereinafter, referred to as a W wire) is wound round to form windings on the stator cores 5 through the front insulator 6b and the rear insulator 6a, whereby a coil 10c and a coil 10f are formed and a W-phase transition wiring 19cf is formed which wires the coil 10c and the coil 10f to each other. Referring particularly to FIGS. 5B and 5C, the W-phase transition wiring 19cf passes through the guide path 33 which lies farthest away from the stator core 5 and is then retained on to a projection 8c. Although the W-phase transition wiring comes closer to the U-phase transition wiring 19ab and the V-phase transition wiring 19be which are taking a path extending from the projection 8b to the projection 8c on a path extending from the coil 10f to the guide path 33 on the projection 8c, since the guide paths 31 to 33 are disposed spaced apart from each other and the lengths A to C of the guide paths 31 to 33 are different from one another, the transition wirings are not brought into contact with each other. In particular, since the length C of the guide path 33 is clearly differentiated from the length A of the guide path 31 and the length C of the guide path 32. In addition, since the guide paths 31 to 33 are disposed in such a manner as to be spaced apart from one another on the projection 8c, as well, there is caused no risk that the transition wirings are brought into contact with one another.

The U-phase transition wiring 19ad is retained from the projection 8a to a projection 8d and then takes a path extending to the coil 10d from the projection 8d. Referring particularly to FIG. 5D, since the U-phase transition wiring 19ad, the V-phase transition wiring 19be and the W-phase transition wiring 19cf are disposed, respectively, on the guide path 31, the guide path 32 and the guide path 33 in such a manner as to spaced apart from one another, there is caused no risk that the respective transition wirings 19 are brought into contact with one another. The V-phase transition wiring 19be takes a path extending from the guide path 32 to a projection 8e, the W-phase transition wiring 19cf takes a path extending from the guide path 33 to the adjacent projection 8e, and the U-phase transition wiring 19ad takes a path extending from the guide path 31 to the coil 10d. Here, since the guide path 31 is a guide path closest to the stator core 5, that is, a guide path nearest to the coil 10d, there occurs no occasion when the transition wirings 19 are brought into contact with one another also on the path extending from the guide path 31 to the coil 10d.

The V-phase transition wiring 19be is retained from the projection 8b to the projection 8e and takes a path extending from the projection 8e to the coil 10e. Referring particularly to FIG. 5E, since the V-phase transition wiring 19be and the W-phase transition wiring 19cf are disposed in the guide path 32 and the guide path 33, respectively, on the projection 8e in such a manner as to be spaced apart from each other, there occurs no occasion when the two transition wirings are brought into contact with each other. Note that the U-phase transition wiring 19ad is not retained on the projection 8e. The W-phase transition wiring 19cf takes a path extending from the guide path 33 to the adjacent projection 8e, and the V-phase transition wiring 19be takes a path extending from the guide path 32 to the coil 10e. Here, since the guide path 32 is a guide path which lies closer to the stator core 5 than the guide path 33, that is, a guide path which lies closer to the coil 10e as well, there occurs no occasion when the V-phase transition wiring 19be and the W-phase transition wiring 19cf come closer to each other on the path extending from the guide path 32 to the coil 10e as well, whereby the adjacent transition wirings are brought into contact with each other in no case.

The W-phase transition wiring 19cf is retained from the projection 8c to a projection 8f and takes a path extending from the projection 8f to the coil 10f. Referring particularly to FIG. 5F, neither the U-phase transition wiring 19ad nor the V-phase transition wiring 19be is retained on the projection 8f. Consequently, there is caused no risk that the W-phase transition wiring 19cf is brought into contact with the U-phase transition wiring 19ad and the V-phase transition wiring 19be on the projection 8f and the path extending from the projection 8f to the coil 10f.

According to the electric motor of the embodiment, the following advantages can be obtained.

(1) Since the electric motor according to the embodiment includes the projections 8 which retain the wirings over the stator 11, the wirings never contact other members such as, for example, the inner circumferential surface 4 of the stator housing 1 and the rotor 18.

(2) In the electric motor according to the embodiment, the guide paths 31 to 33 through which the transition wirings which are wirings connecting the coils 10 together are formed by the projecting pieces 9 provided on the respective projections 8 in such a manner as to be parallel to one another. Since the transition wirings of the U wire, V wire and W wire are retained on the projections 8 in such a manner as to be spaced apart from one another, the contact of the transition wirings on the projections is prevented.

(3) In this embodiment, the lengths A to C of the guide paths 31 to 33 are different from one another and are made to increase gradually towards the stator core 5. Consequently, even when the path of the transition wiring 19 which extends from the coil 10 to the projection intersects or comes closer to the path of the transition wiring 19 which extends from the projection 8 to the adjacent projection 8, there is caused no risk that the transition wirings 19 are brought into contact with each other. Namely, the contact of the transition wirings can be prevented better.

(4) In addition, in the embodiment, since the guide paths 31 to 33 are formed by the projecting pieces 9, the guide paths can be formed inexpensively and easily. In addition, normally, the projecting pieces 9 are formed together with the projections 8 by a mold, and hence, a special processing step such as, for example, a groove cutting process does not have to be added.

In particular, since the respective projecting pieces 9 are arranged in such a manner as to be spaced apart from one another in the direction which is parallel to the straight lines along which the projecting pieces 9 are aligned, the configuration of the mold used becomes simple and easy. Specifically, referring to FIG. 6, projecting pieces 9 are molded together with projections 8 by injecting a resin into spaces defined between an upper mold 40 and a lower mold 41, and separating the upper mold 40 and the lower mold 41 from each other in vertical opposite directions after the resin has been set. Namely, projections 9 are formed in spaces 42 between the upper mold 40 and the lower mold 41. This is because since the respective projecting pieces 9 are arranged in such a manner as to be spaced apart from one another in the direction which is parallel to the straight lines along which the projecting pieces 9 are aligned, there is no need to form a plurality of projecting pieces in the directions in which the upper mold 40 and the lower mold 41 are separated from each other.

(5) In addition, in the embodiment, since the length A of the guide path 31 is determined by the width of the projection 8, there is required no special structure for determining the width of the guide path 31.

(6) In addition, in the embodiment, since the length B of the guide path 32 is determined by the arrangement (intervals) of the projecting pieces 9, there is required no special structure for determining the width of the guide path 32.

Figure 6:
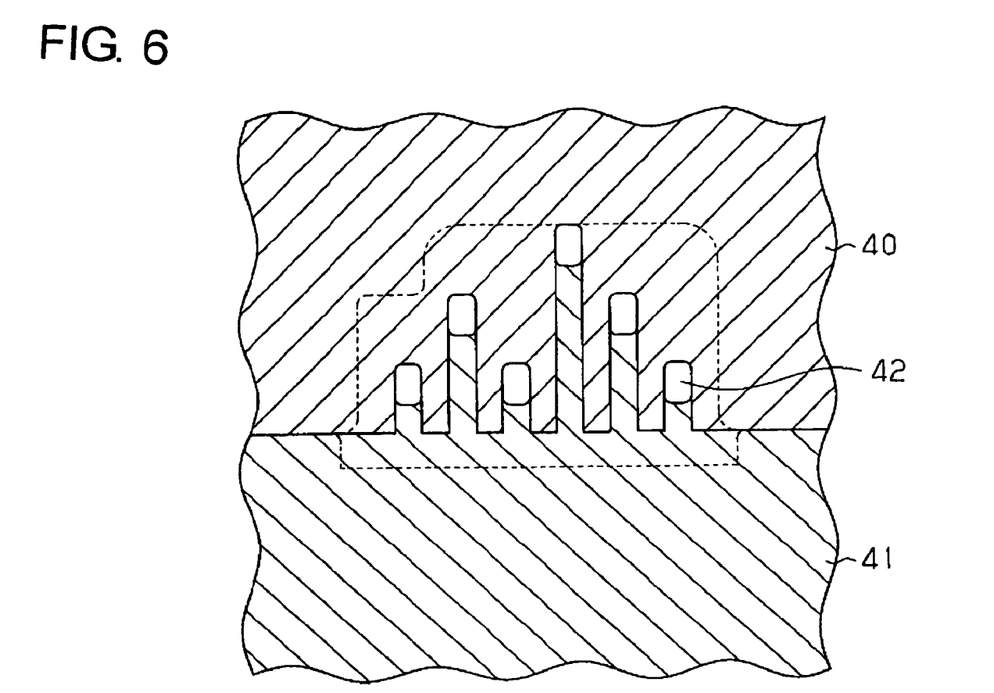
FIG. 6 is an enlarged exemplary view showing a mold for manufacturing the insulator of the electric motor according to the embodiment of the invention.

(7) In addition, in the embodiment, the length C of the guide path 33 is determined by the arrangement (intervals) of the cut-out 20 and the projecting pieces 9. Since the cut-out can also easily be formed by the upper mold 40, the length C of the guide path 33 can easily be formed only by the mold.

Note that the embodiment that has been described heretofore may be modified as follows.

In the embodiment, while the cut-outs 20 are formed, the invention is not limited thereto. In the event that the contact of the transition wirings is prevented by changing the lengths of the guide paths by the projecting pieces 9 or other structures, the same advantage can be provided.

In addition, other methods for configuring guide paths can be conceived than the method for configuring the guide paths in the spaces between the projections 9. For example, it is considered that recessed grooves are provided on the projections 8 so as to make the grooves function as guide paths. Although it is difficult to fabricate such a structure in the fabricating process where the upper mold and the lower mold are separated from each other in the vertical directions, the fabrication can be enabled by providing a cutting step after projecting pieces have been molded by the mold or by modifying the structure of the mold.

While in the embodiment, the invention has been described as being applied to the three-phase six-pole star-connected motor, the invention can also be applied to other forms. For example, the invention can be applied to a delta connection, a three-phase nine-pole motor and a single-phase four-pole motor. As those occur, the number of guide paths is increased or decreased as required.

In addition, the number and arrangement of cut-outs can also be modified as required. While in the embodiment, the out-out 20 is provided only on the one side of the projection, in the event that there is a possibility that transition wirings intersect each other on the opposite side, cut-outs may be provided on both the sides of the projection.

Next, technical concepts that can be grasped from the embodiment and modified examples will additionally be described together with their advantages.

(a) The guide paths may be formed by recessed grooves provided on the projection.

According to the aspect of the invention described in (a), since the guide paths are formed by the recessed grooves provided on the projections, the guide paths can be formed without using or depending upon the projecting pieces. These recessed grooves can be formed by a mold or cutting. In this case, since the plurality of guide paths for disposing thereon the plurality of transition wirings in such a manner as to be spaced apart from one another are formed parallel to one another on the projections, positions on the projections where the transition wirings pass can be fixed, and hence, the contact of the transition wirings on the projections can be eliminated.

(b) A width of the projection may increase towards the stator core.

Consequently, according to the aspect of the invention described in (b), since the width of the projection, that is, the length in the direction parallel to the guide paths increases towards the stator core, the lengths of the guide paths also increase towards the stator core. Consequently, even though a path of the transition wiring which extends from the coil towards the projection intersects a path of the transition wiring which extends from the projection to the adjacent projection, there is caused no risk that the transition wirings are brought into contact with each other. Namely, the contact of the transition wirings can be prevented better.

According to the invention, since the transition wirings of the stator cores can be prevented from being brought into contact with each other, the electric motor can be applied to a variety of applications.

What is claimed is:

1. A stator for an electric motor, comprising:
 a plurality of stator cores comprising a magnetic material;
 an insulator which covers the stator cores; and
 a plurality of insulated electric wires which are wound around the stator cores and disposed on the insulator such that a plurality of coils are formed around the stator cores and a plurality of transition wirings are formed for wiring the plurality of coils to each other,
 wherein the insulator includes a plurality of projections for retaining the plurality of transition wirings,
 wherein the projections are formed with a plurality of guide paths for individually disposing the plurality of transition wirings at intervals and substantially parallel, and
 wherein lengths, in a circumferential direction of the stator, of the plurality of guide paths of a projection of the plurality of projections gradually increase towards the stator core.

2. The stator according to claim 1, wherein the plurality of guide paths are formed by providing a plurality of projecting pieces on a surface of the projection.

3. The stator according to claim 1, wherein the plurality of guide paths are formed by recessed grooves provided on the projection.

4. The stator according to claim 1, wherein a width of the projection increases towards the stator core.

5. An electric motor comprising:
   a substantially cylindrical rotor including a permanent magnet; and
   the stator according to claim 1 which surrounds an outer circumference of the rotor.

6. The stator according to claim 1, wherein a guide path of the plurality of guide paths is formed by a plurality of projecting pieces on a surface of the projection on each side of the guide path.

7. The stator according to claim 1, wherein the projection includes a cut out which extends from an axially outer side of the projection to a guide path of the plurality of guide paths.

* * * * *